May 9, 1967  E. A. WEIDENMILLER  3,318,264
APPARATUS FOR PRODUCING AND CONVEYING CONFECTIONS
Filed March 15, 1965  2 Sheets-Sheet 1
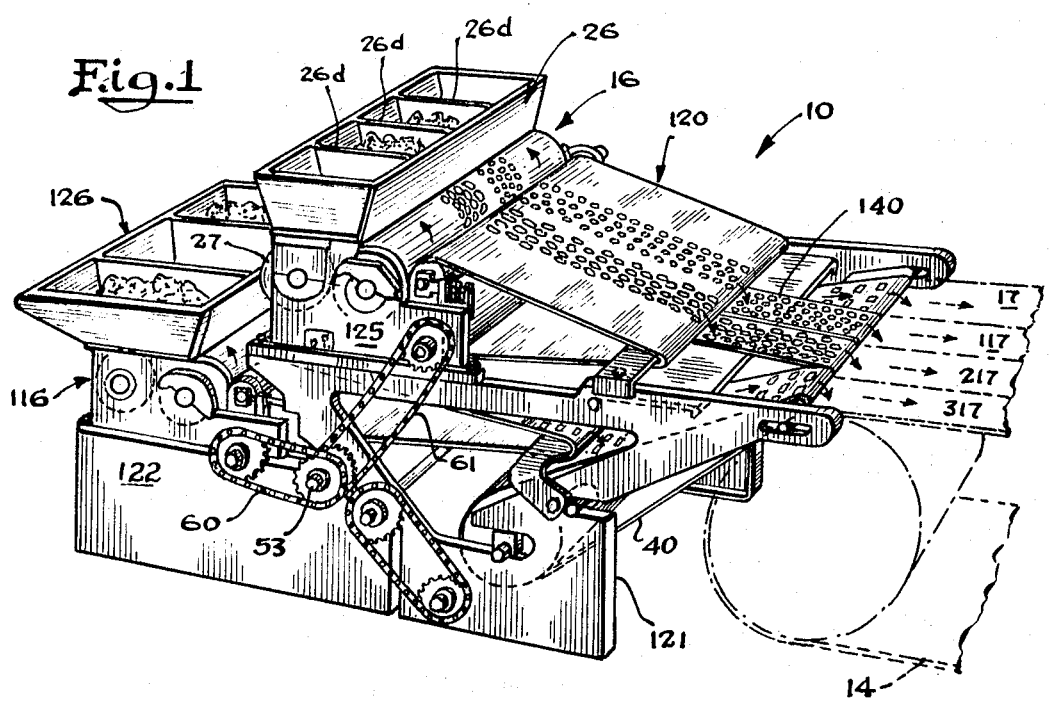
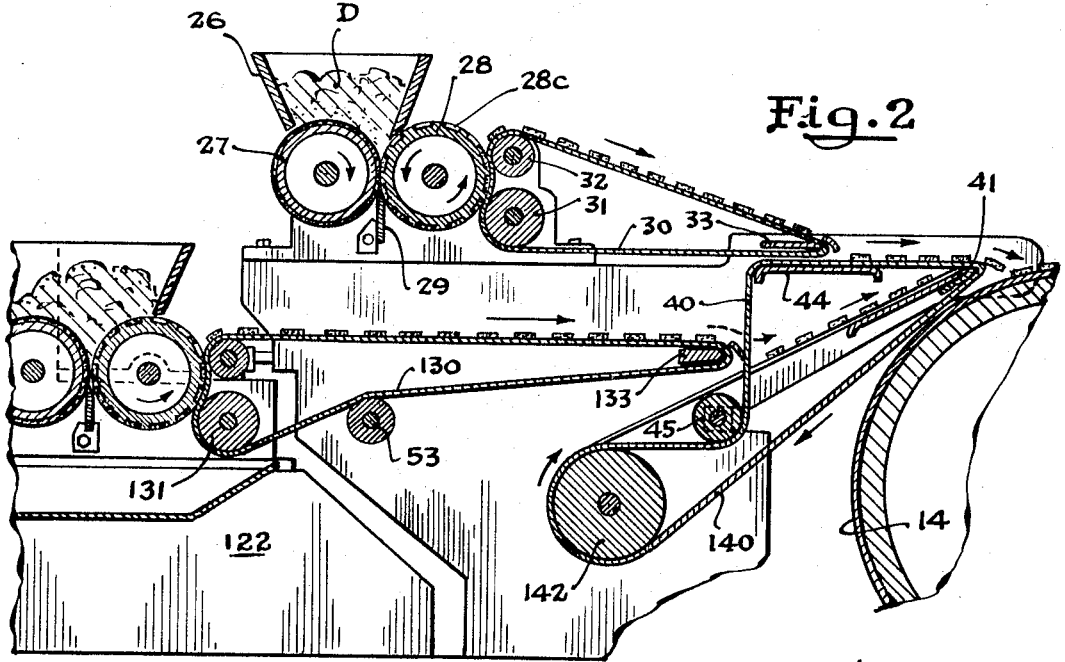
Inventor
Edward A. Weidenmiller
By Mann, Brown & McWilliams
Attorneys

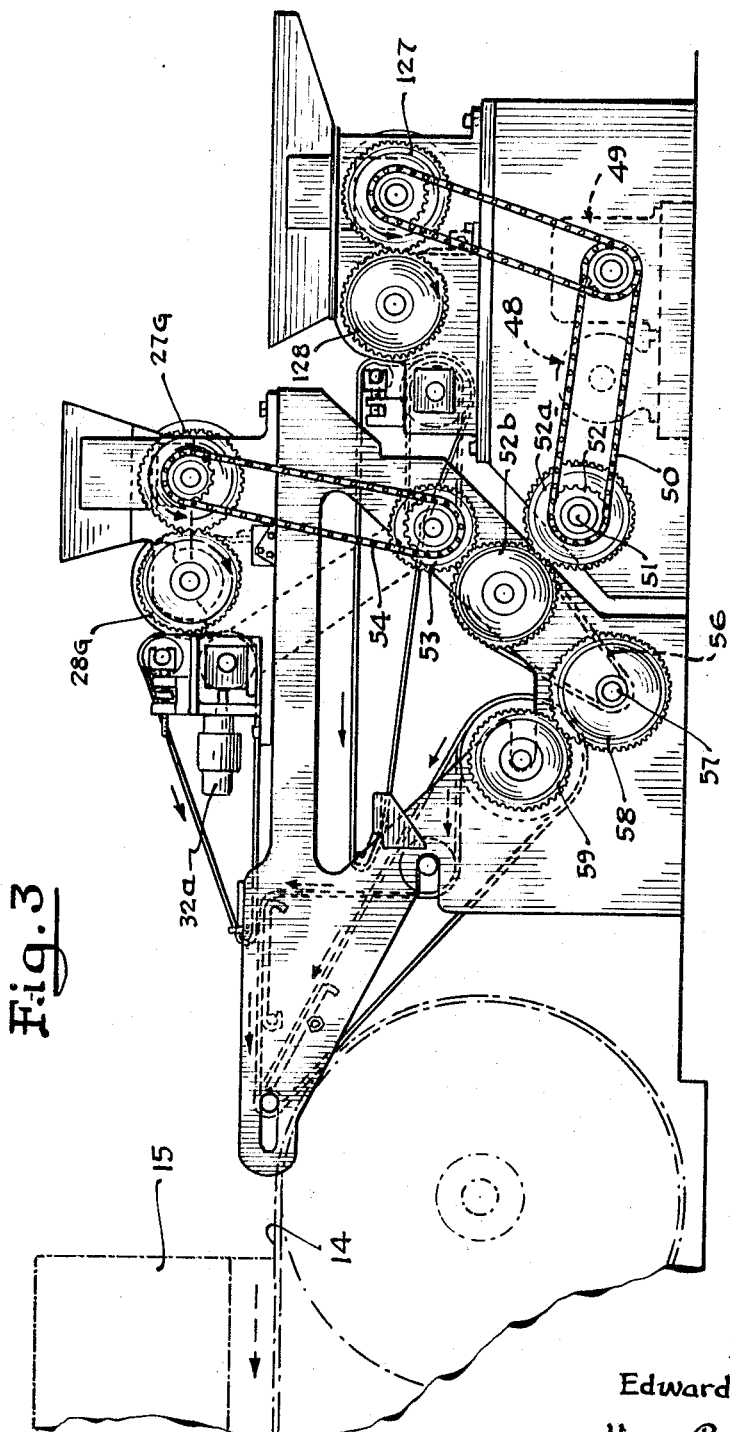

United States Patent Office 3,318,264
Patented May 9, 1967

3,318,264
APPARATUS FOR PRODUCING AND
CONVEYING CONFECTIONS
Edward A. Weidenmiller, 8100 Austin Ave.,
Morton Grove, Ill. 60053
Filed Mar. 15, 1965, Ser. No. 439,890
4 Claims. (Cl. 107—8)

This invention relates to the commercial production of die molded food products such as certain candies, cookies, and the like, and it relates particularly to such products where a plastic food mixture is formed into individual pieces and is then delivered to the conveyor belt or band of a mass finishing apparatus for baking, drying, coating, enrobing and related operations.

In the production of molded or formed food products such as candy, cookies and the like, it has long been recognized that the plastic food mixtures that are to be formed posses widely varying forming characteristics or properties so that despite convention adjustments, one particular forming apparatus cannot be used to shape or preform all, or usually more than one kind of plastic food mixture. Specifically, in regard to the molding of cookies on conventional rotary die and wirecut cookie molding machines, the consistency required by a particular formula, as well as the formula per se, the shortness of dough and even the coloring material used in the dough has been found to require adjustment in the molding procedures.

The differences in molding characteristics between different doughs has introduced manufacturing problems and this is particularly true in recent years where later production techniques involve production lines wherein the cookies are machine molded and delivered directly to the conveyor of a combined oven and cooling installation. Problems arising are due in part to the fact that these steel band conveyor fed ovens deliver the cookies, at the output end of the cooling section of the oven, directly to the finishing or combining stations of the manufacturing line, or in other instances deliver the cookies to the packing machines or packing lines.

As applied for instance to the making of the familiar sandwich cookies comprising individual cookies of different colors or formulae, combined with an intermediate filler layer, the differences in the molding characteristics of the dough of different formulae has made it necessary for all of the cookies of one formula to be molded and baked, after which the second dough is introduced into the molding machine, after appropriate adjustments of the molding characteristics of the machine, and the second run of cookies is produced. The first run of cookies of course must be stored or packed away until after the second run has been made. Then the sandwiching and packing operations may be performed. It is apparent that such split-run operations are uneconomical. It introduces problems of intermediate storage of the first run followed by the extra time and effort involved in combining the cookies of the first run with those of the second run in the sandwiching operation.

Similar difficulties are encountered where it is desired to make an assortment of cookies or confections for packing in a single box, and in this instance differences in the molding operations brought about at least in part by characteristics of the dough of certain of the cookies of the assortment may require a split run operation of the character above described. Thus, the advantages otherwise attainable by the use of the high speed baking and drying equipment are greatly reduced. Indeed, the amount of adjustment and change-over time idles both men and equipment which could otherwise be productive.

In relief of the foregoing problems, it is a primary object of the present invention to provide apparatus to enable plastic food mixtures having different forming characteristics to be formed independently, but at the same time, and once formed, be simultaneously delivered to the finishing section of the installation, as for example, to the conveyor band of an oven. More specifically it is an object of the present invention to provide an installation where different forming machines deliver their output to a common delivery point where the molded or formed products of both machines are discharged in segregated and well defined rows onto the steel band or other conveyor means of the finishing apparatus.

Other and further objects of the present invention will be apparent from the following description and claims, and are illustrated in the accompanying drawings, which, by way of illustration, show a preferred embodiment of the present invention and the principles thereof, and what is now considered to be the best mode in which to apply these principles. Other embodiments of the invention embodying the same or equivalent principles may be used and structural changes may be made as desired by those skilled in the art without departing from the invention.

In the drawings:
FIGURE 1 is a perspective view illustrating a forming apparatus embodying the features of the invention;
FIGURE 2 is a fragmental longitudinal sectional view of the structure shown in FIGURE 1; and
FIGURE 3 is a schematic perspective view of the apparatus.

For purposes of disclosure, the invention is herein illustrated as embodied in a multiple cookie forming and delivery apparatus indicated generally at 10. The apparatus forms groups of different cookie blanks and delivers the same continuous and simultaneously to steel conveyer band 14 of an oven 15 or a similar processing apparatus. The multiple forming and delivery apparatus 10 comprises a pair of generally similar rotary die molding cookie machines 16 and 116 which are conditioned to operate in timed relation to produce exemplary cookie blanks 17, 117, 217 and 317 (shown on band 14). It will be appreciated that while indentical rotary die units are shown, wirecut machines may also be used, also either together, or in combination with a rotary die unit without departing from the invention. The cookie blanks, upon formation, are deposited in accordance with the invention, on novel conveyor means indicated generally at 120 which delivers them to the conveyor band 14 of the oven.

Structurally, the conveyor means 120 supports the rotary molding unit 16 on side frames 121. The rotary molding machine 116 is likewise supported on a mounting frame or base 122 which is at a predetermined level and in a particular relationship to the unit 120 as will be described. The assembly and the delivery unit 120 are located at the input end of the conveyor belt 14 of the oven, and the side frames 121 of the assembly and delivery unit 120 are sufficiently high so that the rotary molding unit 16 is supported at a level above the level of the conveyor band 14 of the oven. The rotary molding unit 116 is disposed at a lower level than the unit 16 and rearwardly of the unit 16 so that the unit 16 and the assembly and delivery unit 120 are located between the conveyor belt 14 and the rotary molding unit 116.

The rotary molding units 16 and 116 are similar in most respects, and are of known construction. The rotary molding unit 16 is supported by members 125 upon which a hopper 26 is also mounted and the bottom of the hopper 26 empties onto a feed roll 27 and a die roll 28 which are spaced a predetermined amount from each other to permit formation of the dough in the dies. Thus, when the two rolls 27 and 28 are operated in unison, a mass of dough D within the hopper 26 is drawn downwardly when it is pressed into and fills die cavities 28C in the die roll 28. The feed roll 27 has longitudinal grooves therein to insure proper feeding of the dough into the cavities, and with further rotation of the die roll, the preformed dough blanks within each cavity, now unbaked cookies or the like, are shaved off by a cutter knife 29 in a known manner. Excess dough in the grooves of the feed roller is returned to the hopper 26.

The cookie blanks, such as blanks 17, that are thus formed within the die cavities 28C are removed from these cavities by extracting mechanism that includes an endless delivery belt 30 that runs against the die roll 28 and the bottom or exposed faces of the cookie blanks in the die cavities thereof. The belt 30 during this contact is guided between the drive roll 31 and a resilient extracting roll 32 that is pressed against the periphery of the die roll 28. The delivery belt 30 extends downwardly to the right as shown in FIGURE 2, and about a nose plate 33 so that the belt then runs horizontally to the left as shown in FIGURE 2 so as to extend about the drive roll 31. The nose plate 33 is in this instance suitably supported on the side plates 121.

Adjusting means 32A is provided (FIGURE 3) which enables the pressure of the roll 32 to be adjusted to attain the optimum extracting action for any particular dough.

The feed roll 27 and the die roll 28 have gears 27G and 28G fixed on the mounting shafts thereof so that these rolls rotate in unison in opposite directions, the mounting shafts of these rolls being supported on the frames 125 of the rotary molding unit 16.

As above pointed out, the molding unit 116 is of substantially similar form, and similar parts in the unit 116 have been identified in the drawing through the use of the same reference character with the prefix 1 added thereto. It might also be pointed out that the nose plate 133 of the rotary molding unit 116 is supported by the side frames 121, and further it may be observed that the upper run of the delivery belt slopes downwardly while the upper run of the belt 130 is substantially horizontal. The molding units 16 and 116 are driven in unison as will be described hereinafter.

It has been pointed out hereinabove that different cookie doughs, by reason of a different color matter or because of a difference in the proportioning of the shortening or other materials, have different molding characteristics so as to, in many instances, prevent the molding of such doughs in a single machine. It may also be pointed out that efforts have been made to alleviate this problem by providing partitions or dividers in the hopper of a single conventional molding machine so that different kinds of dough may be supplied to different compartments of the hopper. This has not been considered to be satisfactory because of the tendency of cookie doughs of different colors to co-mingle at the junctures between the separate compartments of the hopper, and this is true even though relatively wide partitions are used.

Under the present invention, cookie doughs having particular and like molding characteristics are fed from compartments formed by dividers 26d in the hopper 26 of the unit 16, while doughs of a different molding characteristic are fed from the hopper 126 of the other molding machine 116. Hence, units 16 and 116 are suitably adjusted to operate to best advantage on the one particular dough that is supplied to them. Delivery belts 30 and 130 of the respective molding units receive the cookies that are molded thereby, and the assembly and delivery unit 120 is arranged to receive the groups of molded cookie blanks so as to deliver these blanks in a uniform and well ordered relation to the conveyor band 14 in the oven.

In accomplishing this assembly and delivery of the molded blanks from the two molding machines 16 and 116, the unit 120 is provided with two delivery belts 40 and 140 that are arranged to receive cookie blanks respectively from the delivery belts 30 and 130, and to convey these cookie blanks to a common point or line of discharge over the conveyor belt 14 of the oven. In providing the two types of delivery belts 40 and 140 it may be pointed out that these belts, while having a common line of discharge, i.e., where they extend about a nose plate 141, must nonetheless have different lines of travel so that the belts 40 may receive cookie blanks from the delivery belt 30, while the belts 140 may receive cookie blanks from the delivery end of the delivery belt 130. Thus, a drive roll 142 is extended between the side frames 120 below the right hand end of the delivery belt 130 as shown in FIGURE 2, and a pair of relatively narrow final stage delivery belts 140 are extended about the drive roll 142 and about the nose plate 41 so that the upper run of the two delivery belts 140 passes between the discharge end of the delivery belt 130 as shown in FIGURES 2 and 4 of the drawings, and the oven conveyor 14.

The belts 40 extend about the drive roll and likewise over the nose plate 41. The upper run of the belts 140 extends to the left as shown in FIGURE 2 of a guide plate 44 and beneath the discharge end of the delivery belt 30 so that cookie blanks 17 are dropped from the delivery belt 30 onto the horizontal run of the belt 140. The left hand edge of the support plate 44 is located somewhat to the right of the location of the discharge end of the delivery belt 130. This edge of the plate 44 is rounded and the belt 40 extends downwardly about this rounded edge and beneath a guide roll 45. The belts 40 then extend horizontally so as to continue about the drive roll 142.

As pointed out, the two molding units 16 and 116 may be driven in timed relation by a single power source, or alternatively, by separate sources as desired. The collecting and delivering mechanism is constructed with a variable drive mechanism so that the operating elements thereof may be driven in timed relation with the molding units, and may be separately powered if so desired. Thus, as shown particularly in FIGURES 1 and 3, the apparatus is driven from a suitable motor 48 and through a speed reducer 49, and a chain 50 connects the output of the reducer 49 to the shaft of the feed roll 127 of the unit 116. The output of the speed reducer 49 is also connected by a chain 50 to a cross shaft 51 and through a series of gears 52, 52a and 52b to a cross shaft 53 which is in turn connected to a chain drive 54 to the feed roll 27 of the unit 16.

As indicated in FIGURE 3, the gear 52b is connected by a chain drive 56 to a cross shaft 57 which, by means of meshed gears 58 and 59, drives the drive roll 142 in synchronization with the molding units, and accordingly, the final delivery belts 40 and 140. On the opposite side of the machine (FIGURE 1) the cross shaft 53 is connected by chain drives 60 and 61 to the drive rolls 131 and 31 respectively.

While the drawings illustrate a hopper, die roll and conveyor arrangement wherein dough is shown in adjacent central hopper sections on the forward molding unit and in outer sections of the hopper on the rear unit, it is to be understood that this is by way of exemplification and not by way of limitation. Dough may be placed in any convenient combination of hopper sections so long as the combination of sections used are complementary, and cover the entire width of the conveyor system. Further, the number of hopper sections for a given unit may be varied without departing from the invention. It will be appreciated, therefore, that a variety of doughs having different characteristics may be molded simultaneously in the manner herein described, and conveyed in a segregated manner while making optimum use of both molding and baking equipment.

Thus, in accordance with the invention, conveyor means is synchronized with two or more units so as to take die formed confection blanks from the molding units, which are spaced from one another, and place them in clearly defined continuous files on a conveyor leading to a finishing machine. Now, for the first time, confection blanks having varying molding characteristics may be individually molded, and brought together for finishing with a minimum of space required and with virtually no shut-down or change-over time as was previously required.

I claim as my invention:

1. In a device for simultaneously forming confections from doughs having different characteristics, the combination of a frame, a plurality of rotating forming rollers, each said roller having a plurality of die cavities formed on the circumferences thereof, hoppers disposed adjacent said rollers for simultaneously providing different confection materials to said die cavities, a continuous transfer belt contiguous with each said roller for receiving blanks formed in said die cavities thereon, said blanks being deposited in a uniform file thereon, a split take-up conveyor means having a portion thereof disposed adjacent each said transfer belt for receiving blanks therefrom while maintaining said blanks in the same relative position with respect to one another, said take-up conveyor means including a single transverse nose plate disposed adjacent a continuous band, all portions of said conveyor disposed serially on said nose plate for movement thereover, so as to deposit the blanks in separate rows on said band.

2. In a device for simultaneously forming confections of different characteristics, the combination of a frame, a pair of rotating forming rollers, each said roller having sections thereof formed with a plurality of die cavities on the circumferences thereof, hoppers disposed adjacent said sections for simultaneously providing confection materials to said die cavities, a continuous transfer belt contiguous with each said section for receiving blanks formed in said die cavities thereon, said blanks being deposited in a uniform file thereon, take-up conveyor means comprising a plurality of endless belts, one each disposed adjacent each said transfer belt for receiving blanks therefrom while maintaining said blanks in the same relative position with respect to one another, said take-up conveyor means including a single nose plate disposed adjacent a continuous band, each of said endless belts of said conveyor disposed in side-by-side relation on said nose plate for adjacent a continuous band, each of said endless belts of said conveyor disposed in side-by-side relation on said nose plate for movement thereover, so as to deposit the various rows of blanks of like characteristics in distinct rows on said band.

3. In combination, with rotating confection-forming rollers supported on a frame and having a plurality of die cavities formed on the circumference thereof, hoppers adjacent said rollers for supplying confection materials to the die cavities thereon, of a transfer belt contiguous with each said roller, and adapted to receive confection material from said die cavities, intermediate conveyor means having separate portions adapted to receive blanks from said transfer belts, a nose plate for said conveyor disposed adjacent a relatively wide continuous band movable through an oven or the like, all portions of said conveyor being mounted about said nose plate for movement to deposit blanks carried thereby onto said band in uniform segregated files of blanks having like characteristics.

4. In combination with a pair of confection forming machines, a transfer device comprising a transfer belt contiguous with each said machine for receiving formed blanks therefrom, intermediate conveyor means having separate portions adapted to receive blanks from said transfer belts, a nose plate for said conveyor disposed adjacent a relatively wide continuous band movable through an oven or the like, all portions of said conveyor being mounted about said nose plate for movement to deposit blanks carried thereby onto said band in uniform segregated files of blanks having like characterictics.

References Cited by the Examiner

UNITED STATES PATENTS 3,050,017   8/1962   Mahler _____ 107—1

WALTER A. SCHEEL, *Primary Examiner.*

JOSEPH SHEA, *Assistant Examiner.*